United States Patent Office 3,429,760
Patented Feb. 25, 1969

3,429,760
METHOD OF MAKING GLASS REINFORCED RESIN ARTICLES
Thomas George Roskos, Brookfield, Wis., and Bruce J. Green, Kent, Wash., assignors, by mesne assignments, to A. O. Smith Corporation, Milwaukee, Wis., a corporation of New York
No Drawing. Filed Feb. 23, 1965, Ser. No. 434,658
U.S. Cl. 156—167        3 Claims
Int. Cl. D04h 3/16

ABSTRACT OF THE DISCLOSURE

A method of treating glass fibers having a coating of sizing composition containing a resin component. The glass fibers are initially contacted with a solvent capable of dissolving the resin component and maintained in contact with the solvent for sufficient period of time to dissolve only a portion of the resin component and more evenly distribute the remaining portion of the sizing composition on the fibers. Subsequently a second coating of a thermosetting resin bonder is applied to the fibers. The fibers are then formed into the shape of the desired article and the resin is cured to provide a rigid integral structure.

---

This invention relates to a method of making a glass-resin laminate, and more particularly to a process for treating glass fibers prior to fabricating the laminated article.

Reinforced resin articles are generally formed by coating or impregnating reinforcing fibers, such as glass fibers, with liquid, uncured, thermoseting resin, winding or laminating the coated fibers into a series of superimposed layers, and subsequently curing the resin to form a strong integral article.

To improve the bond between the glass fibers and the thermosetting resin, a sizing composition is generally applied to the fibers after they are formed and before they are coated with the resin. A typical sizing composition is an emulsion of a thermosetting resin, such as an epoxide resin in water and also contains a coupling agent, a film former, and an emulsifier-lubricant. After the sizing compound is applied to the fibers, the fibers are dried and wound on a drum or other package. Subsequently, the fibers are unwound from the package and impregnated with thermosetting resin binder and wound or fabricated into the laminated article.

The present invention is directed to a method of treating the glass fibers after sizing which results in an improved bond strength for the laminated article and a greater translucency in the completed product. According to the invention, after the sizing composition is applied to the fibers, the fibers are dried in the conventional manner to evaporate the water in the emulsion. Subsequently, the dried fibers are pased through a solvent bath and are exposed to the solvent for a short period of time, normally a period of 0.5 to 2 seconds. During this exposure to the solvent, a portion, generally in the range of 25% to 50% of the sizing composition, is dissolved. It is believed that the solvent acts to provide a more uniform distribution of the sizing composition on the fibers, thus reducing the void content in the final product. Reducing the void content increases the strength of the article and greatly improves the translucency.

Other objects and advantages will appear in the course of the following description.

According to the conventional practice, glass fibers are drawn from a bushing, collected in the form of a strand or tape and then coated with a standard sizing composition. Subsequently, the coated strand is dried and wound on a drum or other package for storage.

The conventional sizing composition is generally an emulsion of about 2 to 15% by weight of a thermosetting resin in water. The particular thermosetting resin to be used in the sizing composition depends on the resin to be used as the matrix in the final product and also on the physical properties desired in the product. Saturated and unsaturated polyester resins and epoxy resins can be used in the sizing composition. Epoxy resins may be prepared by condensing a polyhydric phenol with a polyepoxide or polyfunctional halohydrin, as disclosed for example, in Patent 2,801,227. The saturated polyester resin can be alkyd type resinous materials formed by condensation reaction of saturated dihydric alcohols, such as ethylene glycol, propylene glycol and the like with saturated dibasic acids, such as phthalic acid, isophthalic acid, succinic acid and the like. Representative is a saturated polyester prepared by condensation reaction of propylene glycol, succinic acid, and phthalic anhydride, as manufactured by the Glidden Company under the trade names GRV-2172 and GRV-3056, or a condensation reaction product of propylene glycol, succinic acid and isophthalic acid, as manufactured by the Glidden Company under the trade names GRV-3048 and GRV-3072, and other Glidden saturated polyesters and the like.

Unsaturated polyesters which can be employed are those formed by condensation reaction of an unsaturated dibastic acid, such as maleic anhydride, with a glycol, as manufactured by Rohm and Haas under the trade Paraplex P-13 and Paraplex AP-48, and the like, or use can be made of flexible unsaturated polyesters formed by condensation reaction of an oil fatty acid, such as linseed fatty acid, with a glycol, as manufactured by Glidden Company under the trade name Glidpol 2001 and Glidpol 2002 and the like, or a polyester formed by condensation reaction of a long chain linseed oil and phthalic acid as manufactured under the trade name Aroplaz 1400.

The sizing composition also contains from 0.2 to 3% of a conventional coupling agent which promotes chemical bonding between the glass fibers and the thermosetting resin subsequently applied. Coupling agents which can be used when dealing with epoxide resins are alkoxy silyl propyl amines, such as gamma aminopropyltriethoxysilane, which can be prepared according to the patent to Jex 2,832,754. In addition, other organo-silicon coupling agents can be used, preferably those having an organic group attached directly to the silicon atom in which the organic group contains less than 8 carbon atoms in aliphatic arrangement and which contains an ethylenic unsaturation. Such other organo-silicon compounds may be represented by vinyltriacetoxysilane, vinyltrichlorosilane, vinyltri(betamethoxy)ethoxysilane, allyldichlorosilane, allyltrichlorosilane, and the water soluble alkali metal salts of the corresponding silanols, such as the sodium salt of vinylsilanol and the like. Use can also be made of epoxy stearate silane or a reaction product of vinylallylsilane, vinyltrichlorosilane and resorcinol.

The sizing composition can also contain from 0.3 to 4.5% by weight of a film former which provides a protective uniform coating on the fibers. The film former is a generally water soluble material, such as polyvinyl alcohol, polyvinyl acetate, polyvinylpyrrolidone, or the like. While polyvinyl alcohols of a fairly wide range can be used, it is desirable to make use of a polymer within the range of Elvanol 52-20 to 52-40. The polyvinyl alcohol component can be replaced in whole or in part with a polyvinyl acetate hydrolyzed sufficiently to provide for the desired degree of water solubility. The vinyl-pyrrolidone can be replaced in the treating composition with a corresponding amount of a polyethylene glycol (Carbowax)

or a polyvinyl methyl ether maleic anhydride condensation reaction product or a cationic amine compound such as tetraethylenepentamine, diallylmelamine or unquaternized polyamides such as marketed by Quaker Chemical Products Corporation under the trade name "Quaker X–1209" or quaternary derivatives of polyimidazoline, such as marketed under the trade name "Quaker X–1160."

A small amount, generally in the range of 0.1 to 1% by weight of an emulsifier-lubricant can be added to the sizing composition which aids in establishing the emulsion and reduces tackiness and drag on the treated fibers. Cationic or nonionic materials, such as Nopcogen 16L and Triton X–100, can be used for this purpose. Nopcogen 16L is a cationic surface active agent which is the reaction product of a diamine, ethylene oxide and lauric acid. Triton X–100 is a nonionic fatty acid oxyethylene alcohol such as octylphenylpolyoxyethylene alcohol. In addition, Carbowax stearates, which are polyethylene glycol stearates or polyethylene glycol palmitates, can be used as the surface active agent. Use can also be made of the reaction product of tetraethylene pentamine with epichlorohydrin and stearic acid or other fatty acid, or of sorbitan mono-oleate polyoxyalkylene derivatives marketed under the trade name "Tween," such as "Tween 81."

A specific example of a sizing composition is as follows in weight percent:

| | Percent |
|---|---|
| Saturated polyester resin | 3.0 |
| Polyvinyl alcohol | 0.1 |
| Polyvinylpyrrolidine | 0.5 |
| Gamma aminopropyltriethoxy silane | 0.3 |
| Nopcogen 16L | 0.1 |
| Water | 96.0 |

The sizing composition is applied to the strand or tape of fibers in any conventional manner. Normally, the fiber strand is passed over a wiper pad or roller coater which contains the sizing composition and the sizing composition is thus applied as a coating to the fibers. The coated fiber strand can then be dried at a temperature generally in the range of 200° to 300° F. to evaporate the water in the sizing composition. Heating of the coated fibers at this temperature will cause a partial cure of the resin component in the sizing composition. It is not essential that the resin be partially cured, but the partial cure will reduce the tackiness of the coating and facilitate handling of the fibrous strand.

The dried fiber strand is then wound on a drum and can be stored in this condition for future use.

According to the invention, the fiber strand, before application of the final resin binder, is passed in contact with a solvent which partially dissolves the sizing composition and more uniformly distributes the composition over the fibers in the strand or tape. The coated fibrous strand is maintained in contact with the solvent for only a short period of time, generally in the range of .5 to 2.0 seconds. The fiber strand can be brought into contact with the solvent in any desired manner, such as by running the strand through a solvent bath. No working of the fibrous strand is required while the strand is in contact with the solvent, and the natural tensioning on the fiber as it passes through the solvent bath is sufficient to enable the solvent to contact the sizing composition and partially dissolve the same.

The solvent can be any conventional, organic, solvent which is capable of dissolving the uncured or partially cured thermosetting resin component of the sizing composition. Solvents such as acetone, methylene chloride, methylethyl ketone, isobutyl ketone, and the like can be used.

As the coated glass strand passes through the solvent the solvent acts to dissolve the resinous component in the sizing composition, as well as the film former and coupling agent. Within the time of contact or exposure, generally about 25 to 50% of the sizing composition is dissolved by the solvent. It is believed that the solvent acts to distribute the sizing composition more uniformly over each individual fiber, thereby reducing the void content in the fibrous strand. By reducing the number of voids, the strength of the resulting article is improved and similarly the reduction of voids also improves the translucency of the final article.

After the fibrous strand is passed through the solvent bath, the solvent remaining on the strand is evaporated. While air drying can be used, the strand is normally heated to accelerate the evaporation. It has been found that directing a heated stream of air over the strand is a very effective method of evaporating the remaining solvent. The temperature of drying depends on the particular solvent employed, and normally will be in the range of 40 to 60° C. for most solvents.

After drying, the liquid uncured thermosetting resin is applied to the strand and the resin coated strand can then be laminated or wound into the desired article by conventional procedures. After the number of laminates or layers have been built up to provide the desired strength for the article, the article is heated to cure the resin and provide a hard, rigid article. As previously mentioned, the resin employed as the binder is usually the same resin used in the sizing composition.

In some winding processes where the final thermosetting resin binder is applied to the fibers by a solvent solution, it is not necessary to dry the treated fibers after passing through the solvent bath. In a situation such as this, the fibers are passed through the solvent bath and then directly into the solvent solution of resin where the resin is applied to the fibers. After application of the resin binder, part or all of the solvent can be removed by drying prior to winding or laminating the resin coated fibers into the desired article.

A specific example of the process of the invention is as follows:

A group of strands of Owens-Corning 819 glass fiber yarn were drawn at a speed of 50 feet/minute from a series of creels and passed through a bath of acetone with a length of approximately twelve inches of each strand being submerged in the acetone. This resulted in a time of exposure with the solvent of about one second.

The fiber strands were then drawn across a nine foot open span where a portion of the solvent was evaporated, and subsequently passed countercurrently to a forced hot air stream at a temperature of 300° F. to completely evaporate the remaining solvent.

The fiber strands were then coated with a liquid epoxy resin (D.E.R. 331 sold by the Dow Chemical Company) mixed with an aromatic amine and subsequently wound in a helical pattern on a 2" mandrel to form a tubular article. After winding, the article was heated at a temperature of 350° F. to cure the resin and provide an integral structure.

The following table shows the improvement in physical properties of glass-resin articles brought about by the process of the invention as applied to Owens-Corning 819 milk bottle glass:

TABLE NOL RING SHEAR DATA

| Treatment | Dry segment shear strength (p.s.i.) | Wet segment shear strength (p.s.i.) | Void content, percent |
|---|---|---|---|
| Control (untreated) | 8,531 | 6,718 | 4.7 |
| Acetone washed | 8,382 | 7,015 | 3.5 |
| Methylene chloride washed | 9,207 | 7,784 | 1.9 |

In the above table, the wet segment shear strength was determined after a seven-day immersion in 190° F. water.

The data in the table indicates that the methylene chloride wash substantially improved the dry and wet shear strength as well as providing a marked decrease in the void content. The acetone wash produced an improvement in the wet shear strength and a substantial reduction in the voil content.

Various modes of carrying out the invention are contemplated as being within the scope of the following claims particularly pointing out and distinctly claiming the subject matter which is regarded as the invention.

We claim:

1. A method of treating glass fibers prior to fabricating a resin-bonded fibrous article, comprising the steps of forming a series of glass fibers, coating the fibers with a sizing composition having an uncured thermosetting resin component, applying a solvent for said resin component to the coated fibers and maintaining the solvent in contact with the coated fibers for a period of time sufficient to dissolve a portion of the resin component and more evenly distribute the remaining portion of the sizing composition on the fibers, thereafter applying a second coating of a thermosetting resin binder on said fibers, forming the resin coated fibers in the shape of the desired article, and curing the resin to provide a rigid structure, the solvent treatment reducing the voids and providing a resin bonded fibrous article having improved strength and translucency.

2. A method of treating glass fibers prior to fabricating a resin-bonded fibrous article, comprising the steps of forming a series of glass fibers, coating the fibers with a sizing composition having an uncured thermosetting resin component, and including a coupling agent and an evaporable carrier, heating the fibers to a temperature sufficient to evaporate the carrier and partially cure the resin, passing the coated fibers in contact with a solvent for said resin and said coupling agent for a period of 0.5 to 2 seconds, heating the fibers to evaporate the residual solvent associated with the coated fibers, thereafter applying a second coating of a thermosetting resin binder on said fibers, forming the resin coated fibers in the shape of the desired article, and curing the resin to provide a rigid structure, the solvent treatment reducing the voids and providing a resin bonded fibrous article having improved strength and translucency.

3. A method of treating glass fibers prior to fabricating a resin-bonded fibrous article, comprising the steps of forming a series of glass fibers, coating the fibers with a sizing composition having an uncured thermosetting resin component selected from the group consisting of epoxy resins and polyester resins, passing the coated fibers through a quantity of solvent capable of dissolving said resin component, maintaining the coated fibers in contact with the solvent for a period of 0.5 to 2 seconds to dissolve a portion of the resin component on the fibers, subsequently heating the fibers to evaporate the residual solvent associated with the coated fibers, applying a thermosetting resin binder to the fibers, winding the fibers about a mandrel to form a tubular article and thereafter curing the thermosetting resin binder to provide a strong integral tubular article.

References Cited

UNITED STATES PATENTS

| | | | |
|---|---|---|---|
| 2,763,573 | 9/1956 | Biefeld | 117—72 |
| 2,868,668 | 1/1959 | Caroselli. | |
| 2,910,378 | 10/1959 | Hauserman | 117—72 |
| 3,261,736 | 7/1966 | Eilerman. | |

PHILIP DIER, *Primary Examiner.*

U.S. Cl. X.R.

65—3; 117—72, 126; 156—173